(12) United States Patent
Dinon

(10) Patent No.: US 7,789,042 B1
(45) Date of Patent: Sep. 7, 2010

(54) COMBINATION PET LEASH AND BOWL

(76) Inventor: Susan M. Dinon, P.O. Box 174, Humarock, MA (US) 02047-0174

( * ) Notice: Subject to any disclaimer, the term of this patent is extended or adjusted under 35 U.S.C. 154(b) by 244 days.

(21) Appl. No.: 12/080,442

(22) Filed: Apr. 3, 2008

(51) Int. Cl.
*A01K 5/01* (2006.01)
*A01K 27/00* (2006.01)
(52) U.S. Cl. .................. 119/61.5; 119/795; 119/796
(58) Field of Classification Search ... 119/61.56–61.57, 119/769, 907, 794–796
See application file for complete search history.

(56) References Cited

U.S. PATENT DOCUMENTS

| | | |
|---|---|---|
| D216,897 S | 3/1970 | Meath |
| 4,226,456 A | 10/1980 | Barnett |
| 4,762,087 A | 8/1988 | Henecke |
| 5,105,768 A | 4/1992 | Johnson |
| 5,233,942 A | 8/1993 | Cooper et al. |
| 5,441,017 A | 8/1995 | Lindsay |
| 5,540,469 A | 7/1996 | Albert |
| D376,215 S | 12/1996 | Gomm et al. |
| 5,718,192 A | 2/1998 | Sebastian |
| 5,727,500 A | 3/1998 | Conboy |
| D393,504 S | 4/1998 | Eisman |
| 5,752,464 A * | 5/1998 | King et al. ............ 119/63 |
| 5,826,547 A | 10/1998 | Gajewska |
| D402,426 S | 12/1998 | Levine et al. |
| 5,890,456 A | 4/1999 | Tancrede |
| 5,890,637 A | 4/1999 | Furneaux |
| 6,016,772 A | 1/2000 | Noyes |
| 6,019,067 A | 2/2000 | Carey |
| 6,019,244 A | 2/2000 | Jones |
| 6,035,809 A | 3/2000 | Fingerett et al. |
| D425,265 S | 5/2000 | Rubinstein |
| D425,266 S | 5/2000 | Rubinstein |
| 6,073,590 A | 6/2000 | Polding |
| 6,085,695 A | 7/2000 | Miller et al. |
| D438,000 S | 2/2001 | Couchon et al. |
| 6,223,695 B1 | 5/2001 | Edwards et al. |
| 6,237,533 B1 | 5/2001 | Rodriguez |
| 6,240,881 B1 | 6/2001 | Edwards et al. |
| 6,276,305 B1 | 8/2001 | Pages |
| 6,314,917 B1 | 11/2001 | Ryan |
| 6,418,881 B1 | 7/2002 | Starratt |
| D463,074 S | 9/2002 | Couchon et al. |
| D464,179 S | 10/2002 | Petersen et al. |
| 6,516,748 B1 | 2/2003 | Jackson |
| D481,837 S | 11/2003 | Iafelice |
| D488,591 S | 4/2004 | Hall et al. |
| D492,454 S | 6/2004 | Saunders |
| 7,044,080 B2 * | 5/2006 | Rabello ............ 119/61.56 |
| 7,063,045 B2 | 6/2006 | Van Meter |
| D527,495 S | 8/2006 | Bird |
| 7,194,982 B2 | 3/2007 | Edwards |
| 2002/0083900 A1 * | 7/2002 | Williams ............ 119/51.01 |
| 2003/0154931 A1 | 8/2003 | Ostrowiecki |
| 2005/0028743 A1 * | 2/2005 | Wechsler ............ 119/52.1 |
| 2006/0054107 A1 | 3/2006 | Baker |
| 2006/0207522 A1 | 9/2006 | Perkitny |
| 2006/0219182 A1 * | 10/2006 | Rabello ............ 119/61.56 |
| 2006/0219188 A1 | 10/2006 | Beaupre |

(Continued)

*Primary Examiner*—Rob Swiatek
*Assistant Examiner*—Ebony Evans
(74) *Attorney, Agent, or Firm*—John P. McGonagle

(57) ABSTRACT

A leash handle to which a pet food and water receptacle are removably attached.

3 Claims, 3 Drawing Sheets

U.S. PATENT DOCUMENTS

| | | |
|---|---|---|
| 2006/0231043 A1 | 10/2006 | Galdo |
| 2006/0272595 A1 | 12/2006 | Edwards |
| 2007/0119378 A1 * | 5/2007 | Fick .......................... 119/52.1 |
| 2007/0163507 A1 * | 7/2007 | Lynch ..................... 119/61.56 |
| 2007/0277738 A1 * | 12/2007 | Dentsbier .................... 119/77 |

* cited by examiner

COMBINATION PET LEASH AND BOWL

BACKGROUND OF THE INVENTION

This invention relates to pet leashes, and in particular, to a pet leash having a handle with a removably attached bowl.

It has become increasingly common for pet owners, especially dog owners, to take their pets for daily walks of several miles and lasting an hour or more. Pet owners who run, jog or hike frequently take their pets with them on such jaunts. During these activities it is not unusual for the pet to develop a need for water or other nourishment. Providing water or food to a pet is greatly facilitated by having a receptacle to both hold the food and/or water and also provide a means for the pet to access the food and/or water. However, carrying such a receptacle may not be convenient for the pet owners. Also, even a light-weight receptacle is bulky and awkward to carry on a run or long hike.

In the past harnesses have been devised to allow animals to carry food and/or water. However, such harnesses tend to be cumbersome and awkward to use, while also restricting the pets ability to move about. Accordingly, there is a need for a device which allows dogs to contribute to carrying its own food and water, while providing a suitable container from which the dog can eat and/or drink.

SUMMARY OF THE INVENTION

The present invention solves some of the aforementioned problems by providing a leash handle to which a pet food receptacle and/or water receptacle may be removably attached. The receptacles are adapted to carry food and/or water. When it is desirable to feed or water the dog, the receptacle(s) may be removed from the leash handle and positioned on some nearby flat surface. The receptacles would then be opened making their contents available to the pet.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF INVENTION

Figure 1:
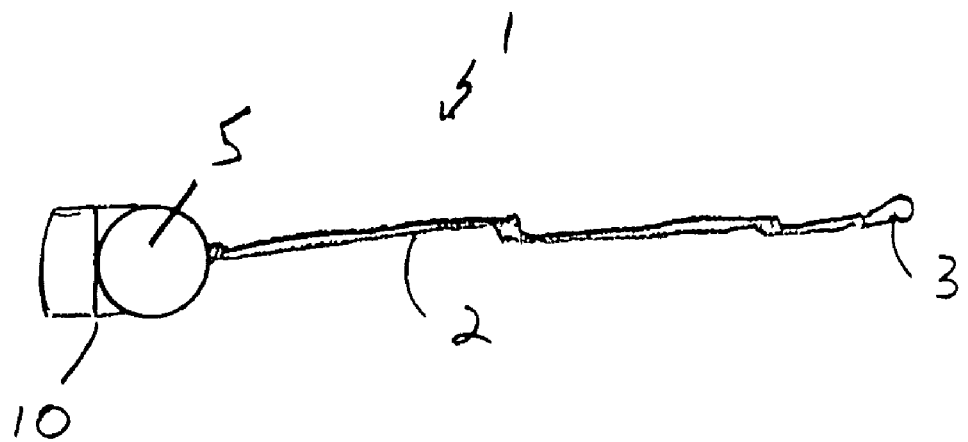
FIG. 1 is a view of a typical pet leash.
Figure 2:
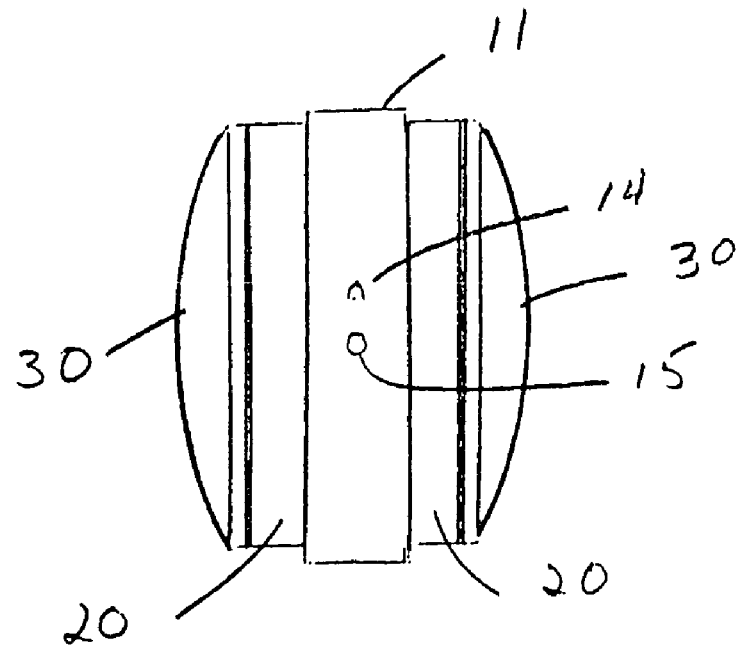
FIG. 2 is a front view of the invention leash handle.
Figure 3:
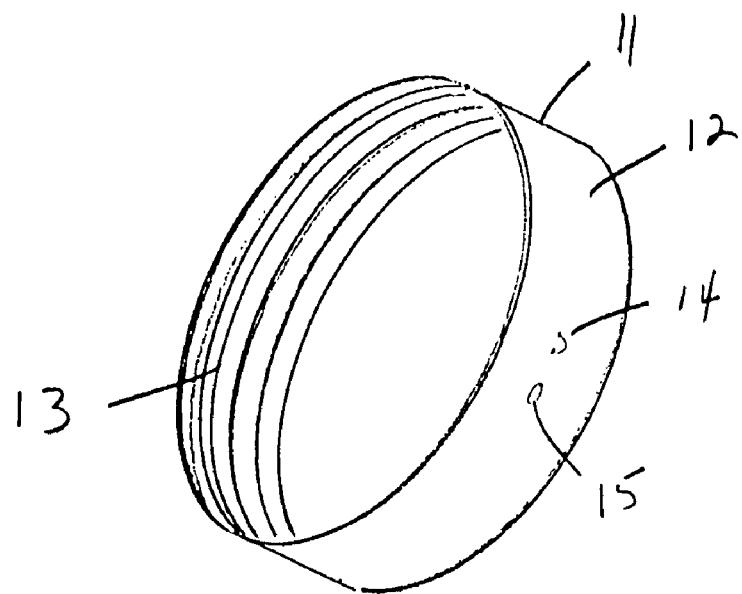
FIG. 3 is a perspective view of the leash handle annulus.
Figure 4:
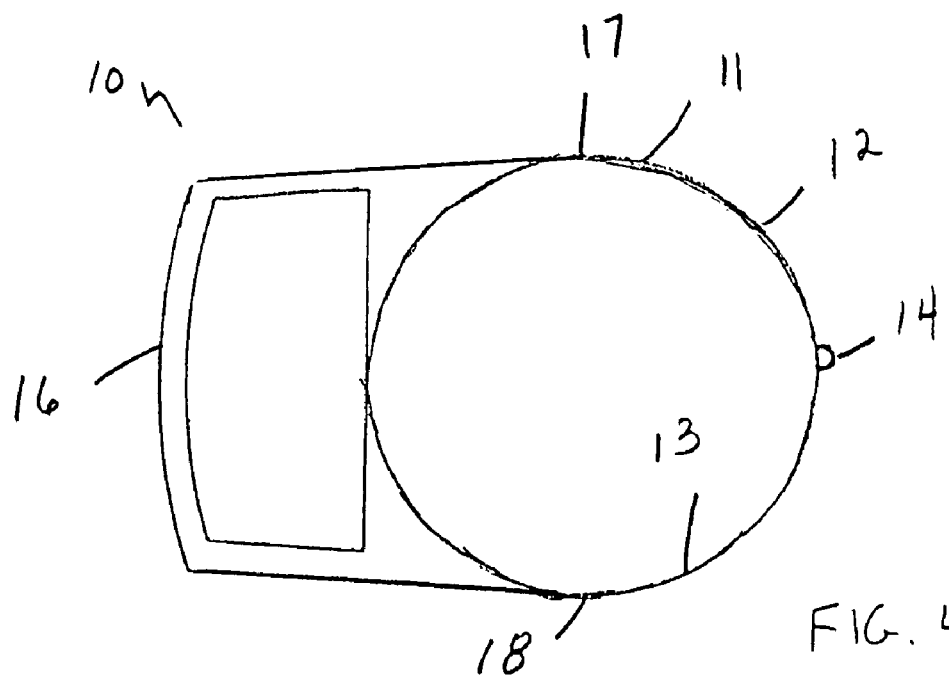
FIG. 4 is a side view of the leash handle.
Figure 5:
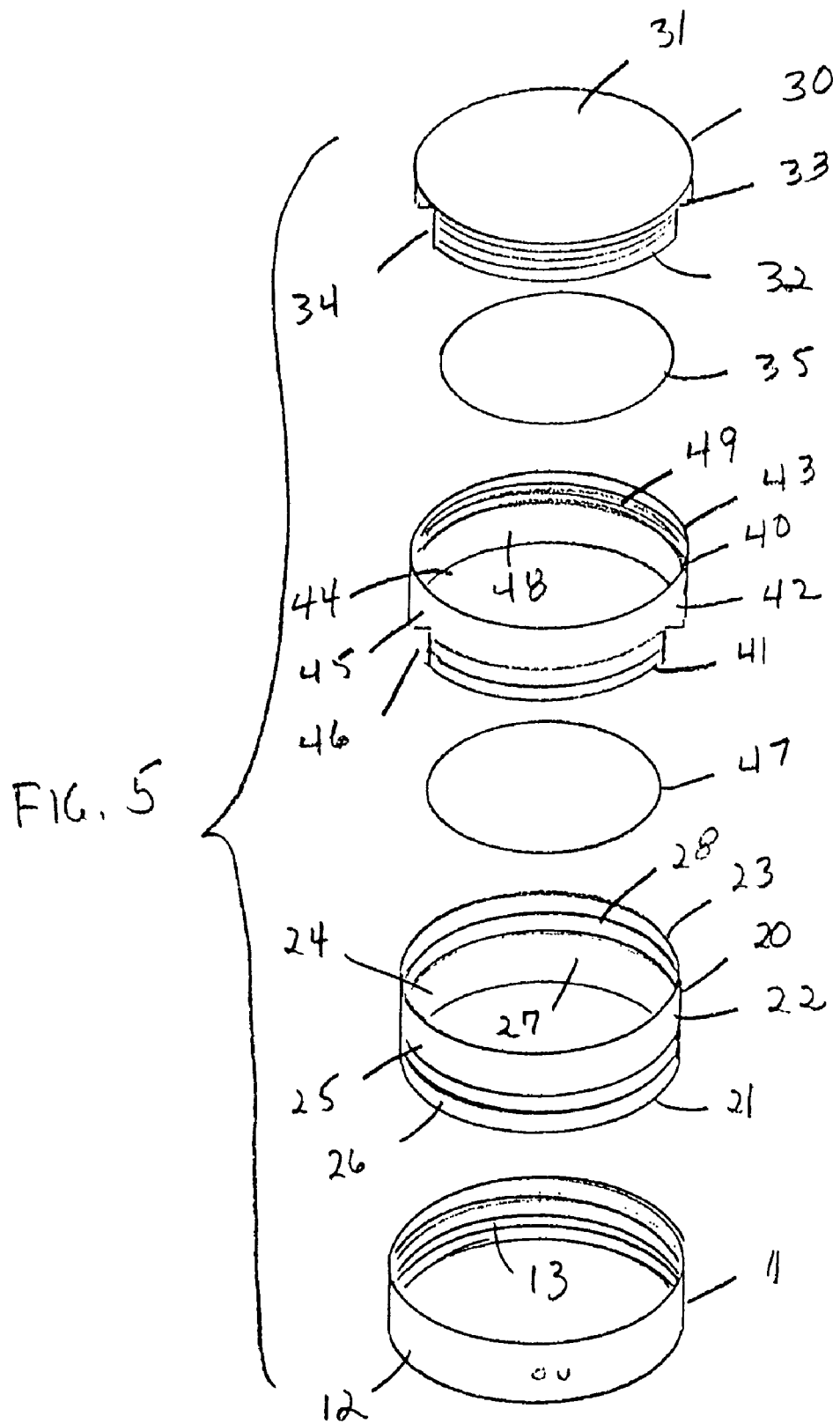
FIG. 5 is an exploded view of the leash handle with receptacle.

Referring to the drawings in detail wherein like elements are indicated by like numerals, there is shown a typical dog leash 1 comprised of an elongated tether 2 terminating at one end in a pet collar fastener 3 and removably attached at the other end to a leash handle 10 constructed according to the present invention. The tether 2 may be a strap, chain, rope or something similar. The leash handle 10 is substantially comprised of an annulus 11 having an exterior surface 12 and a threaded interior surface 13. The annulus 10 has a tether connection means 14 attached to the annulus exterior surface 12. A looped grip 16 is attached to the annulus exterior surface 12 opposite the tether connection means 14, beginning at a point 17 approximately 90 degrees along the annulus exterior surface 12 from the tether connection means 14 to a point 18 approximately −90 degrees along the annulus exterior surface 12 from the tether connection means 14.

One or two receptacles 20 are removably attached to the leash handle annulus 11. Each receptacle 20 has a bottom 21 from which a cylindrical side wall 22 extends toward and terminating at an open top 23, each said receptacle being generally cylindrical in shape, the longitudinal axis of each said cylindrical receptacle being generally perpendicular to the receptacle bottom 21. The receptacle bottom, side wall and top define a receptacle interior 24. The receptacle has an exterior surface 25. The receptacle exterior surface 25 has an exterior threaded portion 26 adjacent the receptacle bottom 21. The receptacle exterior surface exterior threaded portion 26 is adapted to threadingly engage the leash handle threaded interior surface 12. Two receptacles 20 may be laterally attached to the leash handle annulus 11.

In a preferred mode, each receptacle has a lid 30. To accommodate a lid, each receptacle interior 24 has a threaded portion 28 along an interior surface 27 of the side wall 22 adjacent the receptacle top 23. Each lid 30 has a generally annular shape and has a top 31, bottom 32, and side wall 33 interconnecting said top and bottom. An annular channel 34 is formed about the lid side wall 33 adjacent the lid bottom 32. The lid channel 34 is threaded and is adapted to threadingly engage the receptacle interior threaded portion 28. A resilient "O" ring 35 may be fitted within the lid channel 34 to ensure a liquid impervious seal when the lid 30 is fully engaged with the receptacle 20.

The present invention leash handle 10 will also accommodate a retractable leash component 5. The leash handle 10 has an aperture 15 formed adjacent the tether attachment means 14. The retractable leash component 5 is attached to the leash handle annulus 11 in place of one of the receptacles 20. The retractable leash component tether 6 is passed through the leash aperture 15 and is adapted to engage a pet collar in typical fashion. Even with the retractable leash component 5 there is sufficient room in the leash handle 10 to attach a receptacle 20. In another embodiment of the invention, the retractable leash component 5 is centered within the leash handle annulus 11 and a receptacle 20 is attached to the leash handle on each side of the retractable leash component 5.

Each receptacle 20 may be further comprised of a removable compartment 40. Each removable compartment 40 has a bottom 41 from which a cylindrical side wall 42 extends toward and terminating at an open top 43, said removable compartment being generally cylindrical in shape, the longitudinal axis of said removable compartment being generally perpendicular to the removable compartment bottom 41. The removable compartment bottom, side wall and top define a removable compartment interior 44. An annular channel 46 is formed about a removable compartment side wall exterior surface 45 adjacent the removable compartment bottom 41. The removable compartment channel 46 is threaded and is adapted to threadingly engage the receptacle interior threaded portion 28. A resilient "O" ring 47 may be fitted within the removable compartment channel 46 to ensure a liquid impervious seal when the removable compartment 40 is fully engaged with the receptacle 20. The removable compartment 40 also has a threaded portion 49 along an interior surface 48 of the side wall 42 adjacent the removable compartment top 43. The lid 30 may be directly attached to the removable compartment 40 by the threaded lid channel 34 threadingly engage the removable compartment interior threaded portion 49. The removable compartment 40 may hold water or doggie treats, while the receptacle 20 holds food or something different than what is held in the removable compartment 40. The removable compartment 20 and receptacle 40 may be separated from each other and the leash handle, both then acting as bowls adapted to rest on a reasonably flat surface.

It is understood that the above-described embodiment is merely illustrative of the application. Other embodiments may be readily devised by those skilled in the art which will embody the principles of the invention and fall within the spirit and scope thereof.

I claim:

1. A combination pet leash and bowl, comprising:
a leash handle comprising:
   an annulus having an exterior surface and a threaded interior surface;
   a tether connection means attached to the annulus exterior surface;
   a looped grip attached to the annulus exterior surface opposite the tether connection means;
   an elongated tether terminating at one end in a pet collar fastener and removably attached at the other end to said leash handle;
a first receptacle removably attached to the leash handle, said first receptacle having a bottom from which a cylindrical side wall extends toward and terminating at an open top, said first receptacle being generally cylindrical in shape, said first receptacle having a longitudinal axis generally perpendicular to the first receptacle bottom, said first receptacle bottom, side wall and top defining a first receptacle interior, said first receptacle having an exterior surface;
an exterior threaded portion on the first receptacle exterior surface adjacent the first receptacle bottom; said first receptacle exterior surface exterior threaded portion adapted to threadingly engage the annulus threaded interior surface;
a threaded portion along an interior surface of the first receptacle side wall adjacent the first receptacle top;
a generally annular first lid having a top, bottom, and side wall interconnecting said top and bottom, said first lid side wall having a threaded annular channel adjacent the first lid bottom, wherein said first lid threaded annular channel is adapted to threadingly engage the first receptacle interior threaded portion;
a first receptacle removable compartment having a bottom from which a cylindrical side wall extends toward and terminating at an open top, said first receptacle removable compartment being generally cylindrical in shape and having a longitudinal axis generally perpendicular to the first receptacle removable compartment bottom, said first receptacle removable compartment bottom, side wall and top defining a first removable compartment interior, said first receptacle removable compartment having an annular channel formed about a first receptacle removable compartment side wall exterior surface adjacent the first receptacle removable compartment bottom, said first receptacle removable compartment channel being threaded and adapted to threadingly engage the first receptacle interior threaded portion;
wherein, the first removable compartment has a threaded portion along an interior surface of the first removable compartment side wall adjacent the first removable compartment top, wherein said first lid is adapted to being attached to the first removable compartment by the threaded first lid channel threadingly engaging the first removable compartment interior threaded portion;
a retractable leash component attached to said annular interior surface;
an aperture in said annulus adjacent the tether attachment means, wherein said elongated tether is attached to the retractable leash component through said annulus aperture;
a second receptacle removably attached to the leash handle, said second receptacle having a bottom from which a cylindrical side wall extends toward and terminating at an open top, said second receptacle being generally cylindrical in shape, said second receptacle having longitudinal axis generally perpendicular to the second receptacle bottom, said second receptacle bottom, side wall and top defining a second receptacle interior, said second receptacle having an exterior surface;
an exterior threaded portion on the second receptacle exterior surface adjacent the second receptacle bottom, said second receptacle exterior surface exterior threaded portion adapted to threadingly engage the annulus threaded interior surface;
a threaded portion along an interior surface of the second receptacle side wall adjacent the second receptacle top;
a generally annular second lid having a top, bottom, and side wall interconnecting said top and bottom, said second lid side wall having a threaded annular channel adjacent the second lid bottom, wherein said second lid threaded annular channel is adapted to threadingly engage the second receptacle interior threaded portion;
a second receptacle removable compartment having a bottom from which a cylindrical side wall extends toward and terminating at an open top, said second receptacle removable compartment being generally cylindrical in shape and having a longitudinal axis generally perpendicular to the second receptacle removable compartment bottom, said second receptacle removable compartment bottom, side wall and top defining a second removable compartment interior, said second receptacle removable compartment having an annular channel formed about a second receptacle removable compartment side wall exterior surface adjacent the second receptacle removable compartment bottom, said second receptacle removable compartment channel being threaded and adapted to threadingly engage the second receptacle interior threaded portion; and
wherein, the second removable compartment has a threaded portion along an interior surface of the second removable compartment side wall adjacent the second removable compartment top, wherein said second lid is adapted to being attached to the second removable compartment by the threaded second lid channel threadingly engaging the second removable compartment interior threaded portion.

2. The pet leash according to claim 1, further comprising:
a resilient "O" ring fitted within the lid channel.

3. The pet leash according to claim 2, further comprising:
a resilient "O" ring fitted within the removable compartment channel.

* * * * *